(12) United States Patent
Bang et al.

(10) Patent No.: US 7,272,421 B2
(45) Date of Patent: Sep. 18, 2007

(54) WIRELESS EARPHONE CHARGING ADAPTER

(75) Inventors: Yong-Seok Bang, Seoul (KR); Hee-Sun Tak, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 123 days.

(21) Appl. No.: 10/998,977

(22) Filed: Nov. 30, 2004

(65) Prior Publication Data

US 2005/0143142 A1    Jun. 30, 2005

(30) Foreign Application Priority Data

Dec. 27, 2003   (KR) ...................... 10-2003-0098036

(51) Int. Cl.
*H04B 1/38* (2006.01)
(52) U.S. Cl. ...................... 455/573; 455/41.2; 379/441
(58) Field of Classification Search ................ 455/573, 455/41.1, 41.2, 568, 575.2; 320/103; 379/441
See application file for complete search history.

(56) References Cited

U.S. PATENT DOCUMENTS

| | | | |
|---|---|---|---|
| 6,519,448 B1* | 2/2003 | Dress et al. ................ | 455/41.2 |
| 2002/0016188 A1* | 2/2002 | Kashiwamura ............. | 455/568 |
| 2004/0051497 A1* | 3/2004 | Richards et al. ............ | 320/103 |
| 2004/0091102 A1* | 5/2004 | Tsay ........................... | 379/441 |
| 2005/0059344 A1* | 3/2005 | Chang ........................ | 455/41.1 |
| 2005/0136839 A1* | 6/2005 | Seshadri et al. ........... | 455/41.2 |

* cited by examiner

*Primary Examiner*—Joseph Feild
*Assistant Examiner*—Michael T. Vu
(74) *Attorney, Agent, or Firm*—Roylance, Abrams, Berdo & Goodman, LLP

(57) ABSTRACT

Disclosed is a wireless earphone charging adapter capable of charging a rechargeable battery of a wireless earphone using the power source from a reproducing device. The wireless earphone charging adapter comprises an adapter connection terminal detachably connected to a main body connection terminal electrically connected to a power source of the main body, a charging terminal electrically connected with the adapter connection terminal, wherein a terminal of the rechargeable battery of the wireless earphone is detachably connected with the charging terminal, and a housing securing the adapter connection terminal and the charging terminal. The housing is formed with a placing groove, within which the wireless earphone is placed so that the terminal of the rechargeable battery of the wireless earphone can remain in the state of being connected with the charging terminal.

4 Claims, 5 Drawing Sheets

WIRELESS EARPHONE CHARGING ADAPTER

CROSS-REFERENCE TO RELATED APPLICATIONS

This application claims the benefit of priority under 35 U.S.C. §119(a) to Korean Patent Application No. 2003-98036, entitled "WIRELESS EARPHONE CHARGING ADAPTER", filed on Dec. 27, 2003, in the Korean Intellectual Property Office, the entire contents of which are hereby incorporated by reference.

BACKGROUND OF THE INVENTION

1. Field of the Invention

The present invention relates to an adapter for charging a rechargeable battery housed in a wireless earphone. In particular, the present invention relates to a wireless earphone charging adapter capable of charging the rechargeable battery of a wireless earphone using a power source of a main body in which the wireless earphone is employed.

2. Description of the Related Art

In general, conventional wireless earphones are used with devices that reproduce music or other audible signals. These reproducing devices include hand-held portable cassette players, MP3 players, among others. The wireless earphone receives sound signals wirelessly transmitted from a sound signal transmission unit of a main body and reproduces the sound signals into sound through a speaker provided in the wireless earphone. Such a wireless earphone comprises a receiver for receiving radio sound signals, and a battery for supplying electric power required for the receiver. Rechargeable batteries are generally used as the portable power source, which are capable of being charged and discharged many times.

Conventional wireless earphones are therefore provided with an exclusive charger for charging a rechargeable battery housed in the wireless earphone. The charger for a wireless earphone is typically formed as a DC power supply unit that supplies current of a predetermined rating required for charging the rechargeable battery when it is connected to a commercial power source. Therefore, the rechargeable battery of a wireless earphone can be charged only at a place where the commercial power source is provided.

When the conventional wireless earphone is used with a hand-held portable cassette player, or an MP3 player while commuting or when outdoors, no commercial power source is available. There is a problem in that because the rechargeable battery of the wireless earphone cannot be recharged after having been completely discharged, it is impossible to continuously use the portable cassette player or the MP3 player.

SUMMARY OF THE INVENTION

Accordingly, the present invention has been made to solve the problems discussed above and others not mentioned, and an object of the present invention is to provide a wireless earphone charging adapter that allows a rechargeable battery of a wireless earphone to be charged with an alternative power source, such as the main battery of the reproducing device, thereby further enhancing the portability of the wireless earphone.

In order to achieve the above objects, there is provided a wireless earphone charging adapter according to an embodiment of the present invention for charging a rechargeable battery housed in a wireless earphone receiving signals wirelessly transmitted from a reproducing device, wherein the wireless earphone charging adapter comprises an adapter connection terminal detachably connected with a reproducing device connection terminal electrically connected to a power source of the main body, a charging terminal electrically connected with the adapter connection terminal, wherein a terminal of the rechargeable battery of the wireless earphone is detachably connected with the charging terminal and a housing that secures the adapter connection terminal and the charging terminal. The housing is formed with a placing groove, within which the wireless earphone is laid down so that the terminal of the rechargeable battery of the wireless earphone can remain in the state of being connected with the charging terminal.

According to an embodiment of the present invention, the main body connection terminal is provided at a recess formed on one side of the main body and the adapter connection terminal is provided at a projection. The projection is formed on the housing in a shape corresponding to the recess so that the housing can be secured to the one side of the main body. In accordance with another embodiment of the present invention, the outer surface of a speaker of the wireless earphone is usual as the terminal of the rechargeable battery of the wireless earphone.

According to still another embodiment of the present invention, the adapter connection terminal, the charging terminal and the housing are formed so that two wireless earphones can be simultaneously charged.

Accordingly, wireless earphone charging adapter according to an embodiment of the present invention, enhances the portability of a wireless earphone because the rechargeable battery housed in the wireless earphone can be charged using a power source of the reproducing device such as its main battery.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Certain embodiments of the present invention will be described in greater detail with reference to the accompanying drawings, in which like reference numberless are used to describe like elements. The matters defined in the description such as a detailed construction and elements are provided to assist in a comprehensive understanding of the embodiments of the invention. Thus, it is apparent that the present invention can be carried out without those defined matters. Furthermore, well-known functions or constructions are not described in detail for purposes of conciseness and clarity.

Figure 1:
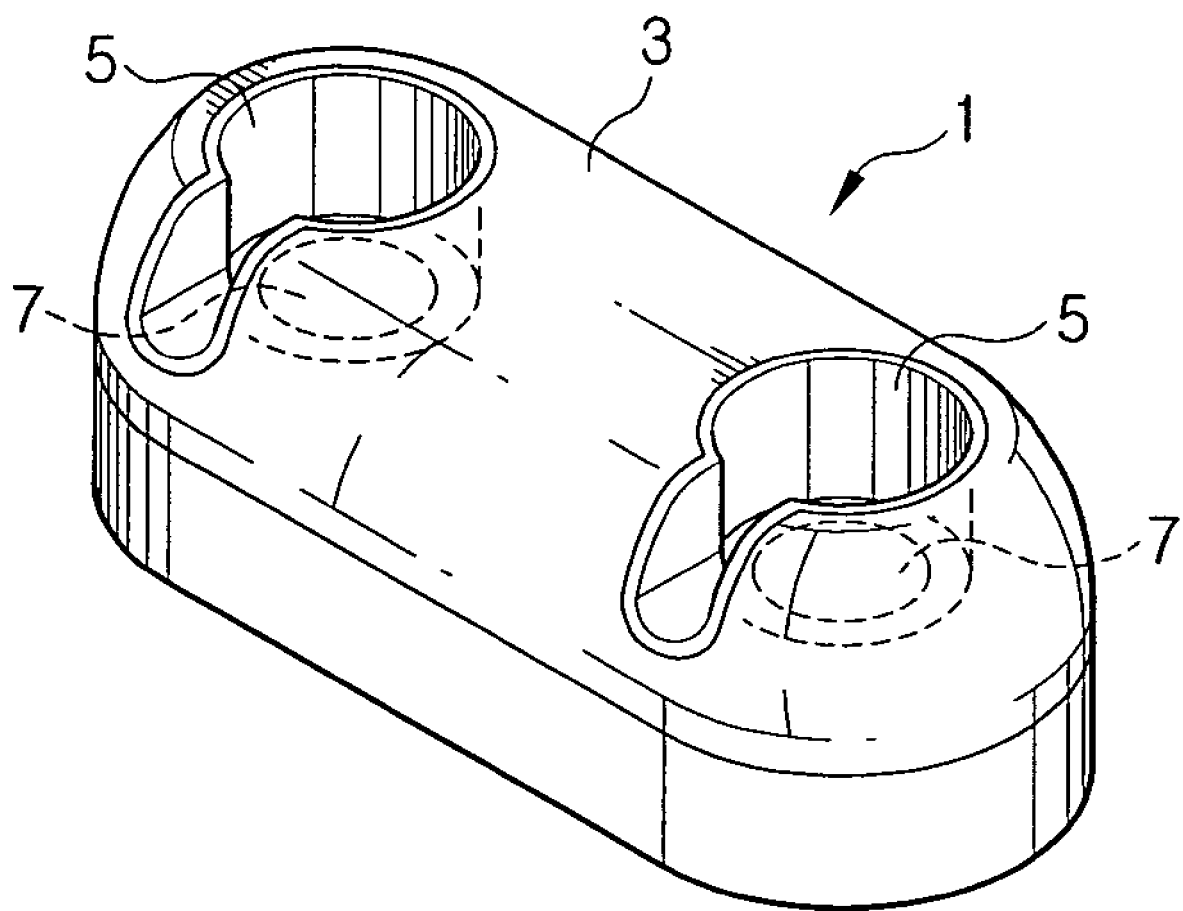
FIG. 1 is a perspective view showing an embodiment of a wireless earphone charging adapter according to an embodiment of the present invention.
Figure 2:
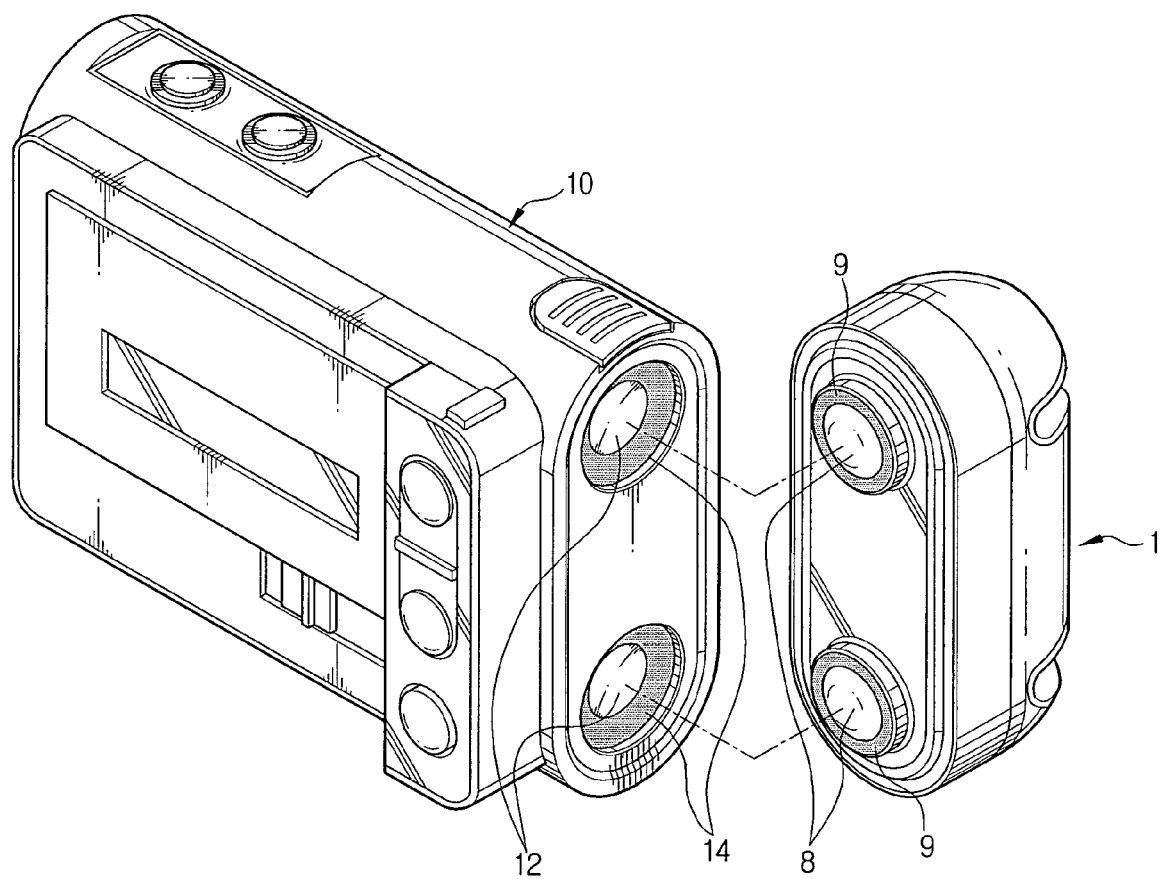
FIG. 2 is a perspective view showing main body connection terminals in the reproducing device, with which the wireless earphone charging adapter of FIG. 1 is engaged and adapter connection terminals in the wireless earphone charging adapter.

Referring to FIGS. 1 and 2, the inventive wireless earphone charging adapter 1 comprises a housing 3, charging terminals 7, and adapter connection terminals 9.

On the top of the housing 3, there are provided placing grooves 5, into each of which a wireless earphone is placed when charging the earphone is desired. The number of placing grooves 5 can vary depending on the number of wireless earphones. For example, if a single wireless earphone is used, there could be only one placing groove 5, and if two wireless earphones are used, two placing grooves 5 can be formed. In addition, the housing 3 is formed with projections 8 at the bottom side thereof so that the housing 3 can be secured to a main body of a reproducing device 10 employing such a wireless earphone. The reproducing device 10, to which the housing 3 of the wireless earphone charging adapter 1 is connected, is also formed with recesses 12 corresponding to the projections 8. The projections 8 of the housing 3 and the recesses 12 of the reproducing device 10 are illustrated in FIG. 2. Referring to FIG. 2, the reproducing device 10 is, in this exemplary embodiment, a camcorder having multi-functions of an MP3 player, a game machine, among others, wherein one side of the reproducing device 10 of the camcorder is formed with two recesses 12 and the housing 3 is formed with two projections 8 corresponding to the two recesses 12.

Figure 3:
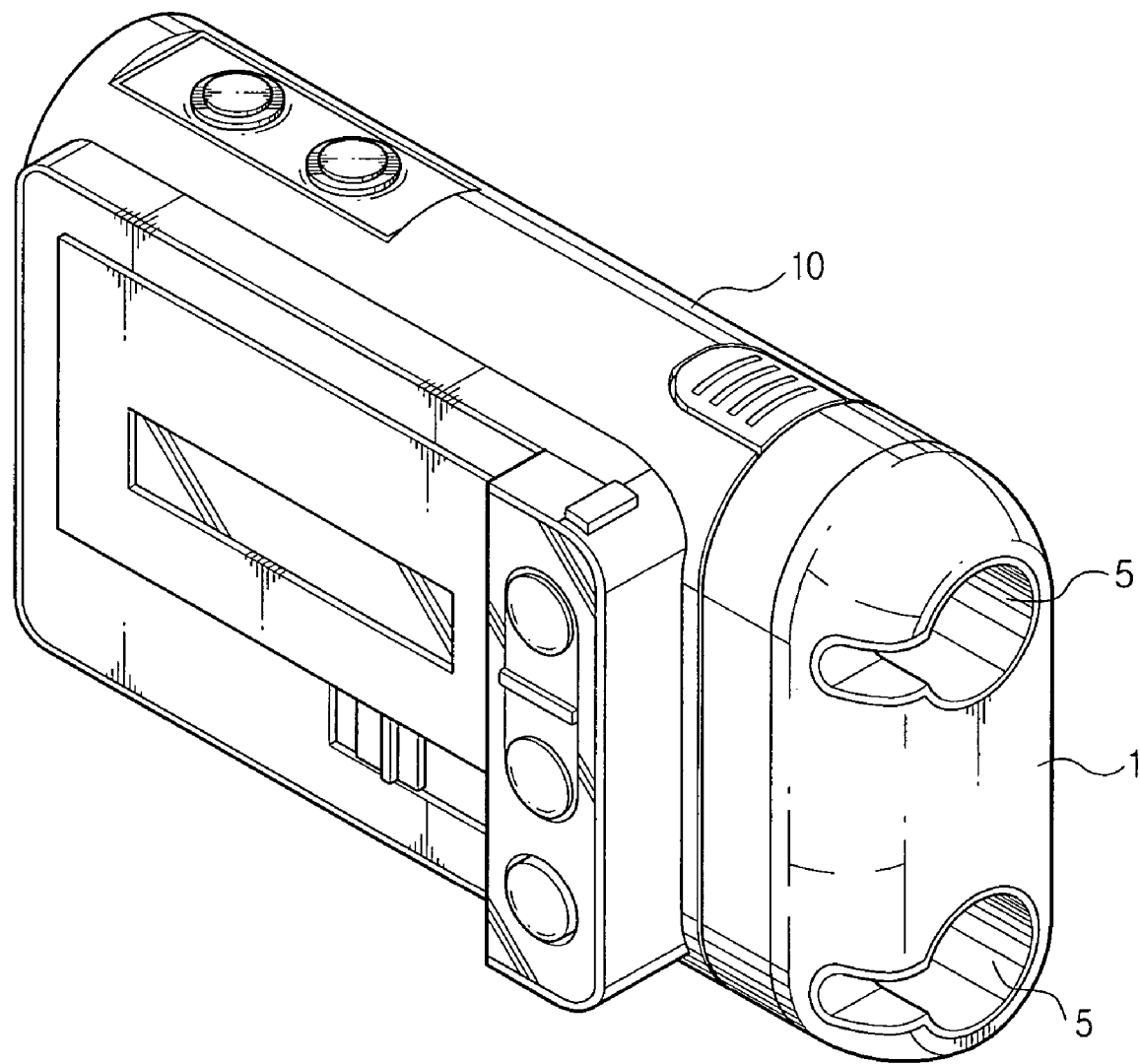
FIG. 3 is a perspective view of the wireless earphone charging adapter of FIG. 1 engaged with the reproducing device.

The embodiments of the present invention are not necessarily limited to a camcorder, as any reproducing device can be used. If the wireless earphone charging adapter 1 is mounted on the reproducing device 10, the wireless earphone charging adapter 1 is secured integrally with the reproducing device 10 as shown in FIG. 3 by a connection arrangement not shown in the drawings. Because the connection arrangement between the reproducing device 10 and the wireless earphone charging adapter 1 can employ any arrangement known in the art for detachably connecting two parts, the detailed description in this regard is omitted.

Figure 4:
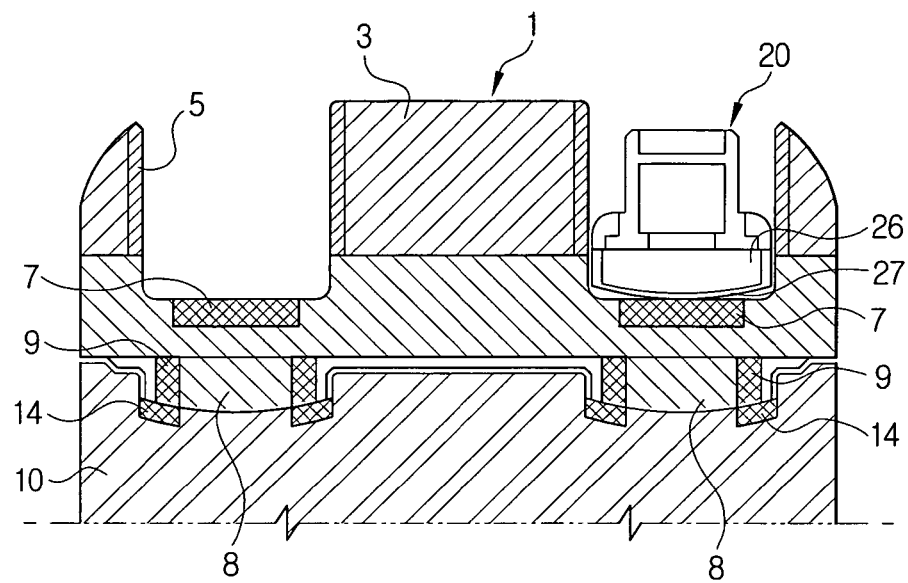
FIG. 4 is a cross-sectional view of a wireless earphone placed within a placing groove of the wireless earphone charging adapter of FIG. 1 in which the wireless earphone charging adapter is engaged with the main body.

The adapter connection terminals 9 are provided in the housing 3 so that they can be connected to reproducing device connection terminals (connection terminals) 14 provided in the reproducing device 10 when the housing 3 is engaged with the reproducing device 10. In the embodiments of the present invention, the adapter connection terminals 9 are provided at the projections 8 of the housing as shown in FIG. 4. The connection terminals 14 are provided at the recesses 12 of the reproducing device 10 as shown in FIG. 2. Because the connection terminals 14 are electrically connected to a power source of the reproducing device 10, (i.e. to a main battery of the reproducing device), the electric current flows from the main battery of the reproducing device 10 to the adapter connection terminals 9 of the wireless earphone charging adapter 1 if the projections 8 of the housing 3 are engaged with the recesses 12 of the reproducing device 10 and the adapter connection terminals 9 and the reproducing device connection terminals 14 are connected with each other. In addition, if the reproducing device 10 is supplied with electric power from an external DC power supply unit, it is possible to configure a circuit so that the adapter connection terminals 9 of the wireless earphone charging adapter 1 can be also supplied with electric current from an external DC power supply unit.

The charging terminals 7 are located in the placing grooves 5 of the housing 3 so that when the wireless earphones 20 are placed in the grooves 5 of the housing 3, the charging terminals 7 can be connected with the terminals of the rechargeable batteries 24 of the wireless earphones 20. In an embodiment of the present invention, the charging terminals 7 are located at the bottoms of the placing grooves 5 as shown in FIG. 4. The terminals of the rechargeable batteries 24 of the wireless earphones 20 come into contact with the bottoms of the placing grooves 5 when the wireless earphones 20 are placed in the placing grooves 5. When the speakers 26 of the wireless earphones 20 are faced toward the bottoms of the placing grooves 5 as shown in FIG. 4, the outer surfaces 27 of the speakers 26 can be configured, in an exemplary embodiment of the present invention, to serve as the terminals of the rechargeable batteries 24.

Figure 6:
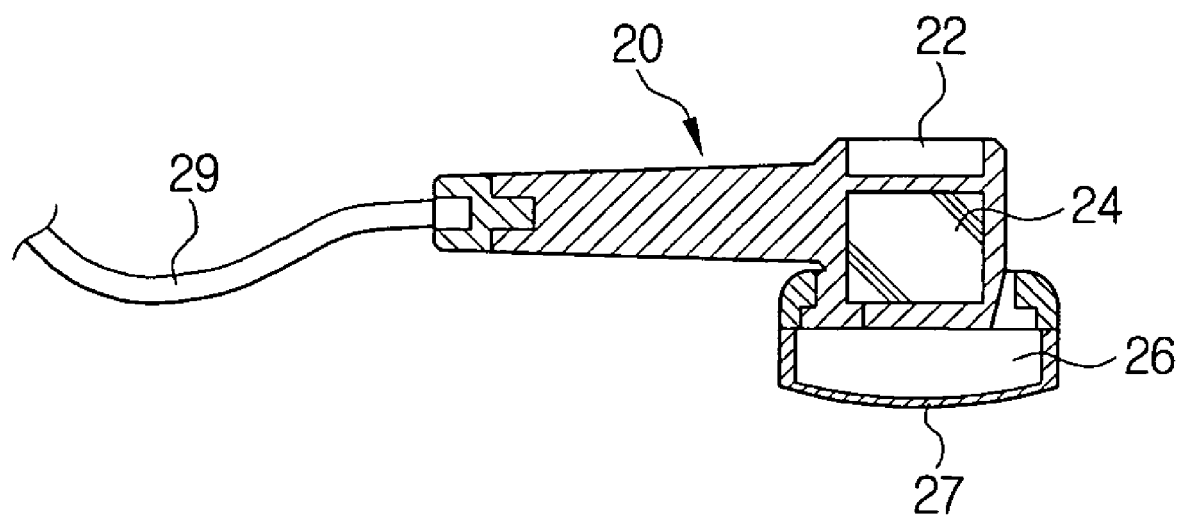
FIG. 6 is a cross-sectional view showing an example of a wireless earphone that can be used with the wireless earphone charging adapter of FIG. 1.

An example of a wireless earphone 20 that can be charged by the wireless earphone charging adapter 1 is illustrated in FIG. 6. Referring to FIG. 6, the wireless earphone 20 comprises a Bluetooth chip 22 capable of receiving sound signals wirelessly transmitted from the reproducing device 10, a speaker 26 for reproducing the sound signals received by the Bluetooth chip 22 into sound, and a rechargeable battery 24 for supplying electric power to the Bluetooth chip 22. The outer surface 27 of the speaker 26 is configured to serve as a terminal of the rechargeable battery 24. Reference numeral 29 indicates a neckwear accessory; a user can interconnect two wireless earphones 20 using the accessory and hang the accessory on the user's neck.

Use of the wireless earphone charging adapter according to an embodiment of the present invention will now be described in detail with reference to the drawings. When charging the rechargeable batteries 24 housed in either (or both) of the wireless earphones 20, the wireless earphone charging adapter 1 is mounted to the reproducing device 10. If the projections 8 formed on the housing 3 of the wireless earphone charging adapter 1 are inserted into the recesses 12, the housing 3 is secured integrally with the reproducing device 10 by a connection arrangement not shown in the drawings.

When the wireless earphone charging adapter 1 is mounted on the reproducing device 10, the connection terminals 14 provided at the recesses 12 of the reproducing device 10 and the adapter connection terminals 9 provided on the wireless earphone charging adapter 1 are connected with each other. Because the connection terminals 14 are electrically connected to the power source of the reproducing device 10, (i.e. a main battery), electric current emanates from the main battery and flows to the adapter connection terminals 9 of the wireless earphone charging adapter 1 through the connection terminals 14. Since the adapter connection terminals 9 of the wireless earphone charging adapter 1 is electrically connected to the charging terminals 7, electric current from the main battery flows to the charging terminals 7.

Figure 5:
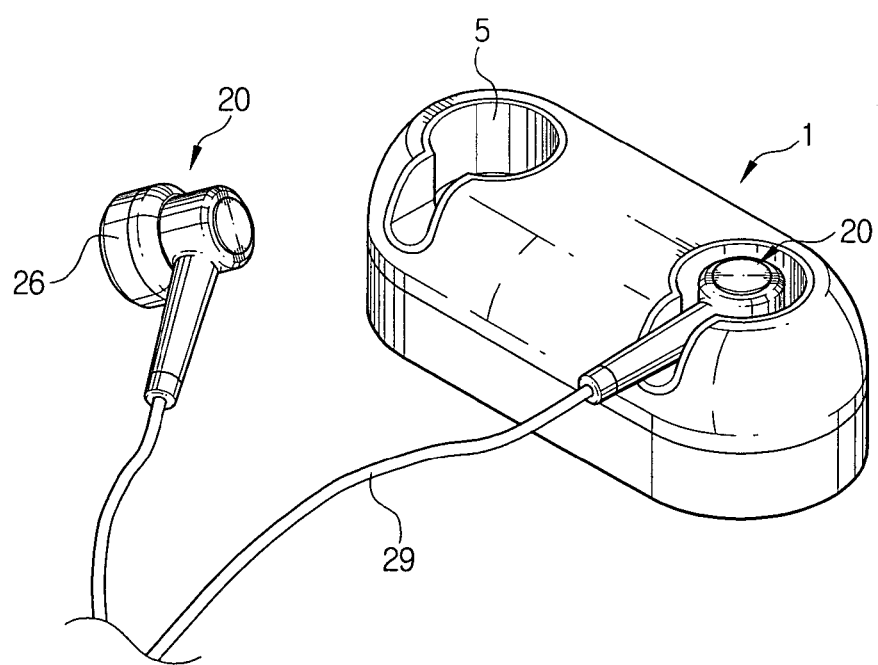
FIG. 5 is a perspective view showing the wireless earphone placed on the wireless earphone charging adapter of FIG. 1.

The two earphones 20 are respectively placed in the two placing grooves 5 of the wireless earphone charging adapter 1 in such a manner that the speakers 26 of the wireless earphones 20 are directed downwardly, as shown in FIG. 5. The outer surfaces 27 of the speakers 26 are connected with the charging terminals 7 as shown in FIG. 4. Because the electric current flows from the main battery of the reproducing device 10 to the charging terminals 7 of the wireless earphone charging adapter 1, the electric current will flow to the rechargeable batteries 24 of the wireless earphones 20 through the outer surfaces 27 of the speakers 26. Thus, the electric current that emanates from the main battery of the reproducing device 10 flows to the rechargeable batteries 24 housed in the wireless earphones 20 through the main body connection terminals 14, the adapter connection terminals 9, the charging terminals 7 and the outer surfaces 27 of the speakers 26, thereby charging the rechargeable batteries 24.

Therefore, if the wireless earphone charging adapter 1 according to the embodiments of the present invention is used, it is possible to charge the rechargeable batteries 24 housed in the wireless earphones 20 even if an external DC power supply unit is not provided. When charging of the rechargeable batteries 24 of the wireless earphones 20 is completed, and the wireless earphone charging adapter 1 is no longer required, it is possible to remove the wireless earphone charging adapter 1 from the main body 10 and to separately keep or carry the wireless earphone charging adapter 1. Accordingly, the wireless earphone charging adapter 1 according to an embodiment of the present invention does not cause any inconvenience in carrying or using the reproducing device 10.

While exemplary embodiments of the present invention have been shown and described to exemplify the principles of the present invention, the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A wireless earphone charging adapter for charging a rechargeable battery housed in a wireless earphone receiving signals wirelessly transmitted from a reproducing device, wherein the wireless earphone charging adapter comprises:

an adapter connection terminal detachably connected with a reproducing device connection terminal electrically connected to a power source in the reproducing device;

a charging terminal electrically connected to the adapter connection terminal, wherein a terminal of the rechargeable battery of the wireless earphone is detachably connected with the charging terminal; and a housing securing the adapter connection terminal and the charging terminal, wherein the housing is formed with a placing groove, within which the wireless earphone is placed so that the terminal of the rechargeable battery of the wireless earphone can remain in the state of being connected with the charging terminal;

wherein the terminal of the rechargeable battery of the wireless earphone comprises an outer surface of a speaker of the wireless earphone.

2. A wireless earphone charging adapter as claimed in claim 1, wherein the reproducing device connection terminal is provided at a recess formed on one side of the reproducing device and the adapter connection terminal is provided at a projection, that is formed on the housing in a shape corresponding to the recess so that the housing can be secured to the one side of the reproducing device.

3. A wireless earphone charging adapter as claimed in claim 1, wherein the adapter connection terminal, the charging terminal and the housing are formed so that two wireless earphones can be simultaneously charged.

4. A wireless earphone charging adapter as claimed in claim 1, wherein the wireless earphone includes a Bluetooth chip which is capable of receiving a signal from the main body.

* * * * *